United States Patent
Chakrabarty et al.

(10) Patent No.: US 11,756,337 B2
(45) Date of Patent: Sep. 12, 2023

(54) AUTO-GENERATION OF SUBTITLES FOR SIGN LANGUAGE VIDEOS

(71) Applicant: Adobe Inc., San Jose, CA (US)

(72) Inventors: Saikat Chakrabarty, Noida (IN); Shivani Karol, New Delhi (IN)

(73) Assignee: Adobe Inc., San Jose, CA (US)

(*) Notice: Subject to any disclaimer, the term of this patent is extended or adjusted under 35 U.S.C. 154(b) by 40 days.

(21) Appl. No.: 17/338,193

(22) Filed: Jun. 3, 2021

(65) Prior Publication Data
US 2022/0391612 A1    Dec. 8, 2022

(51) Int. Cl.
| | |
|---|---|
| G06V 40/20 | (2022.01) |
| H04N 5/278 | (2006.01) |
| G06T 7/73 | (2017.01) |
| G09B 21/00 | (2006.01) |
| G06N 3/08 | (2023.01) |
| G06T 7/246 | (2017.01) |
| G06V 20/40 | (2022.01) |
| G06V 40/10 | (2022.01) |
| G06V 40/16 | (2022.01) |
| G06N 3/044 | (2023.01) |

(52) U.S. Cl.
CPC ............. *G06V 40/28* (2022.01); *G06N 3/044* (2023.01); *G06N 3/08* (2013.01); *G06T 7/248* (2017.01); *G06T 7/73* (2017.01); *G06V 20/46* (2022.01); *G06V 40/107* (2022.01); *G06V 40/168* (2022.01); *G09B 21/009* (2013.01); *H04N 5/278* (2013.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 11,263,409 B2* | 3/2022 | Zhang | G06V 40/113 |
| 11,307,667 B2* | 4/2022 | Banerjee | G06K 9/6218 |
| 2022/0327961 A1* | 10/2022 | Kelly | G09B 21/04 |

OTHER PUBLICATIONS

A Framework for Sign Language Sentence Recognition by Commonsense Context, BY Ignazio Infantino, Member, IEEE, Riccardo Rizzo, and Salvatore Gaglio, Member, IEEE; 1094-6977 (Year: 2007).*

Anonymous, "Meet the new Google translator: An AI app that converts sign language into text, speech," The Economic Times, Oct. 2018, 5 pages, retrieved via Internet: https://economictimes.indiatimes.com/magazines/panache/meet-the-new-google-translator-an-ai-app-that-converts-sign-language-into-text-speech/articleshow/66379450.cms.

(Continued)

*Primary Examiner* — Vikkram Bali
(74) *Attorney, Agent, or Firm* — Nicholson De Vos Webster & Elliott LLP

(57) ABSTRACT

Embodiments are disclosed for a subtitle generator for sign language content in digital videos. In some embodiments, a method of subtitle generation includes receiving an input video comprising a representation of one or more sign language gestures, extracting landmark coordinates associated with a signer represented in the input video, determining derivative information from the landmark coordinates, and analyzing the landmark coordinates and the derivative information by at least one gesture detection model to identify a first sign language gesture.

20 Claims, 12 Drawing Sheets

(56) References Cited

OTHER PUBLICATIONS

Google, Hand Talk Translator app, retrieved via Internet: https://play.google.com/store/apps/details?id=br.com.handtalk&hl=en_IN on Apr. 15, 2022, 3 pages.
Zhang, F. et al., "MediaPipe Hands: On-device Real-time Hand Tracking," CVPR Workshop on Computer Vision for Augmented and Virtual Reality, arXiv:2006.10214v1, Jun. 2020, 6 pages.

* cited by examiner

AUTO-GENERATION OF SUBTITLES FOR SIGN LANGUAGE VIDEOS

BACKGROUND

Videos are an increasingly preferred medium for communicating messages to a wide range of users across different geographic locations. In contrast to conventional approaches of conveying messages simply via text, messages conveyed via video are more easily retained by a viewing user. Increasingly, there has been greater effort in generating content in sign languages, with the intent of making media and technology accessible to all and to bolster inclusiveness. This may include videos authored using sign language and videos that include at least some scenes that include sign language as part of the narrative. However, existing subtitle generation techniques do not readily provide subtitles for sign language content. In the spirit of accessibility, sign-language content should also be easily accessible to a person not versed in sign language.

Content with sign language can be made accessible to everybody by adding subtitles corresponding to the signs. However, in conventional approaches for adding subtitles, the sign language needs to be manually translated while editing the video, which requires a person well versed in that particular sign language and hours of manual effort. Further complicating matters, there are over 135 different sign languages around the world, and in a globalized society the content may have been authored in any one of those languages. Attempts to automate this process require additional hardware and sensors and rely on machine learning techniques that are not performant. Additionally, these techniques are unable to accurately identify dynamic gestures which use movement and placement in addition to the specific gesture to convey meaning.

Thus, conventional approaches to providing subtitles for videos that include sign language content are unable to do so without requiring significant manual intervention and/or requiring additional hardware sensors.

These and other problems exist with regard to generating subtitles for sign language videos in electronic systems.

SUMMARY

Introduced here are techniques/technologies that automatically generate subtitles for sign language content in videos. Embodiments use a plurality of long short term memory networks trained to identify one or more gestures in video. Using LSTM networks allows for accurate identification of dynamic gestures which span across multiple frames of the video without requiring any additional hardware/sensors. Frames of a video can be analyzed to identify landmarks associated with the signer represented in the video. For example, hand landmarks, face landmarks, and/or body landmarks can be identified in the frames. In sign languages, some gestures take their meaning based on the hand's proximity to other parts of the body. Having landmarks of the hand and the face or body allows for gestures to be localized, leading to more accurate gesture identification and fewer false positives.

Using this data across frames, higher order derivatives (e.g., velocity, acceleration, etc.) of the landmark coordinates can be computed. The landmark coordinates and their corresponding derivatives can be provided as input to a plurality of LSTM networks. The LSTM networks can process the input serially, or in parallel, until a gesture is identified. Using the derivatives in addition to the coordinates provides a more accurate gesture classification of dynamic gestures, which span across multiple frames. Once the gestures in the video have been identified, natural language processing techniques are used to generate coherent sentences from the words/phrases corresponding to the gestures. The sentences are timestamped and used to generate subtitles for the sign language content of the video.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
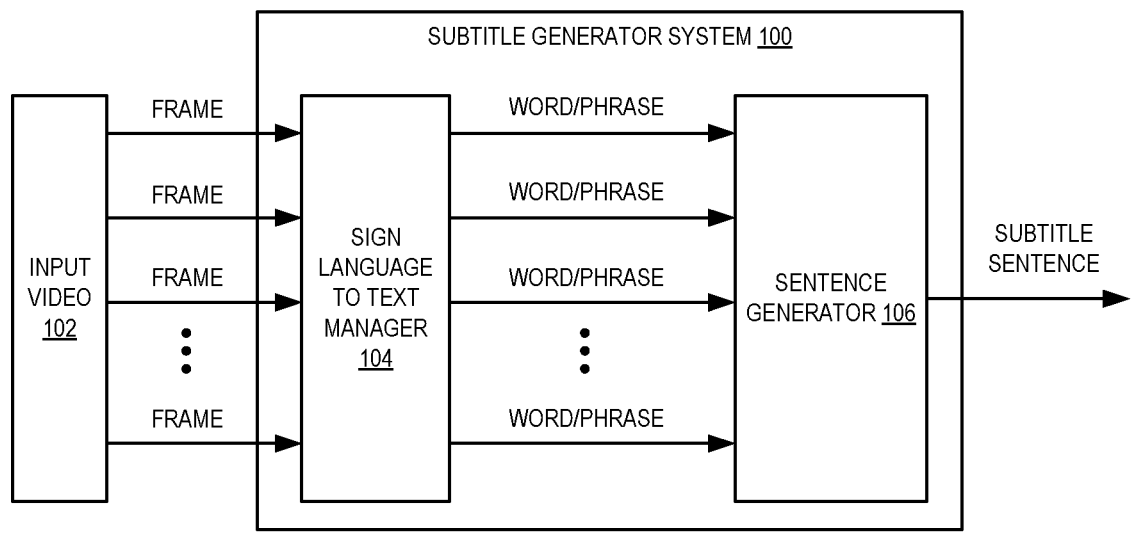
FIG. 1 illustrates a diagram of a sign language subtitle generation system in accordance with one or more embodiments.

One or more embodiments of the present disclosure include a sign language subtitle generator system which uses machine learning to automatically generate subtitles for sign language content in digital videos. In particular, one or more embodiments, use multiple moderately deep long short term memory (LSTM) networks that have been trained to identify one or more gestures across multiple frames of video. This enables the LSTM networks to accurately identify dynamic gestures, which rely on movement, that are depicted in video. Once the video has been processed by the LSTM networks, then a plurality of words and/or phrases have been identified by the sign language subtitle generator system, as well as timestamps associated with those words and/or phrases in the video. Natural language processing techniques are then used to identify sentences from the words and/or phrases. For example, this may include detecting sentence boundaries and stitching together words and phrases to form coherent sentences. These sentences are then used to generate subtitles for the video based on the timestamps associated with the words and/or phrases.

Existing techniques typically rely on manual translation of sign language into subtitles. However, this requires both specialized knowledge of the specific sign language in use as well as hours of effort to generate. Automated techniques typically require additional hardware, such as sensors to gather additional information about the person signing, and/or utilize complex machine learning models, or deterministic algorithms, that are not performant. Additionally, these techniques typically are only capable of identifying static hand gestures that do not rely on movement to convey meaning.

Embodiments address these and other shortcomings in the prior art by using moderately deep LSTM networks and pre-computed higher derivatives of landmark coordinates. A given LSTM network can be trained to identify one or more gestures. When processing video, subtitle generator detects landmarks of the signer. These may include particular points on the signer's hands and/or face. In some embodiments, when available, landmarks of the signer's body, torso, etc. may also be obtained. Higher order derivatives of the movement of these landmarks (e.g., velocity, acceleration, etc.) can be computed across frames. The landmark coordinates and the derivative data can be provided to the LSTM networks to process indicate whether one of the gestures they have been trained to identify is present in the frames being processed. If so, the word or phrase corresponding to the gesture is stored and processing of the video continues until the entire video has been processed. By using the landmark coordinates and the derivative data, moderately deep LSTM networks (e.g., using two LSTM cells) can be used to accurately identify dynamic gestures (e.g., gestures that rely on movement over multiple frames to convey meaning) in video, while requiring less processing time than past techniques.

FIG. 1 illustrates a diagram of a sign language subtitle generation system in accordance with one or more embodiments. As shown in FIG. 1, subtitle generation system 100 can receive an input video 102. Input video 102 may include a digital video comprising a plurality of frames. In various embodiments, digital video can include any digital visual media comprising a plurality of frames which, when played, comprises a moving visual representation (or image) of a story, event, picture, illustration, icon, and/or symbol. To illustrate, a digital video can include, but is not limited to, a digital file with the following file extensions: FLV, SWF, AVI, WMV, MOV, QT, MKV, MP4, or AVCHD.

As shown in FIG. 1, frames of the input video 102 are extracted and processed first by sign language to text manager 104. As discussed further below, sign language to text manager 104 identifies landmarks associated with the signer depicted in the frames of the input video. These landmarks may include hand landmarks, face landmarks, and/or pose landmarks. The sign language to text manager 104 uses these landmarks to perform translation of sign language gestures into words/phrases. For example, to sign 'Yes' in American Sign Language (ASL), the first has to be moved up and down. As such, the dynamic motion of the hand, and not merely the static position of the hand, must be accurately identified to discern the meaning of the gesture.

Additionally, the position of the hand with respect to the body may also affect the meaning of the gesture. For example, to sign "Sorry" in ASL, the first has to be moved in a circular motion in front of the chest region. Similarly, to sign "Hello" in ASL, the hand gesture must be done in proximity to the temple region of the head. As such, embodiments represent the positions of each part of the body using their corresponding landmarks. By using these landmarks, the positions of parts of the body are learned as part of the gesture, reducing the changes of false positives. For example, when the user is moving the hand down to rest position (with fingers as a fist), the gesture network triggers accidental false positives. By localizing the gestures using the landmark data, the incidence of false positives is greatly reduced.

In some embodiments, the sign language to text manager 104 includes a landmark detector to identify these landmarks. The landmark detector may implement one or more machine learning-based techniques which may use, for example, a neural network to identify hand and face landmarks and/or pose landmarks associated with the signer depicted in the video 102. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As discussed, a LSTM networks are used as classifiers which receive the landmark data and associated derivative data as a vector and output a probability that the movement corresponds to a gesture (e.g., class) which the network has been trained to identify. In some embodiments, the terms "long short-term memory neural network," "LSTM network," and "LSTM neural network" refer to a type of recurrent neural network capable of learning long-term dependencies in sequential information. Specifically, an LSTM neural network can include a plurality of layers that interact with each other to retain additional information between LSTM units (e.g., "long short-term memory units" that are layers of the neural network for analyzing each sequential input, such as each word) of the network in connection with a state for each LSTM unit. As used herein, the term "state" refers to a component of each LSTM unit that includes long-term information from previous LSTM units of the LSTM neural network. The LSTM neural network can update the state for each LSTM unit (e.g., during an "update stage") by using the plurality of layers to determine which information to retain and which information to forget from previous LSTM units. The state of each LSTM unit thus influences the information that is retained from one LSTM unit to the next to form long-term dependencies across a plurality of LSTM units.

The word/phrase identified by the LSTM networks of the sign language to text manager 104 are provided to sentence generator 106. The sentence generator 106 may implement natural language processing techniques to generate a sentence from the words and/or phrases identified by the sign language to text manager 104. The sentences can be synced to the video using the time stamps associated with the identified gestures and used as subtitles for the sign language content of the video.

Figure 2:
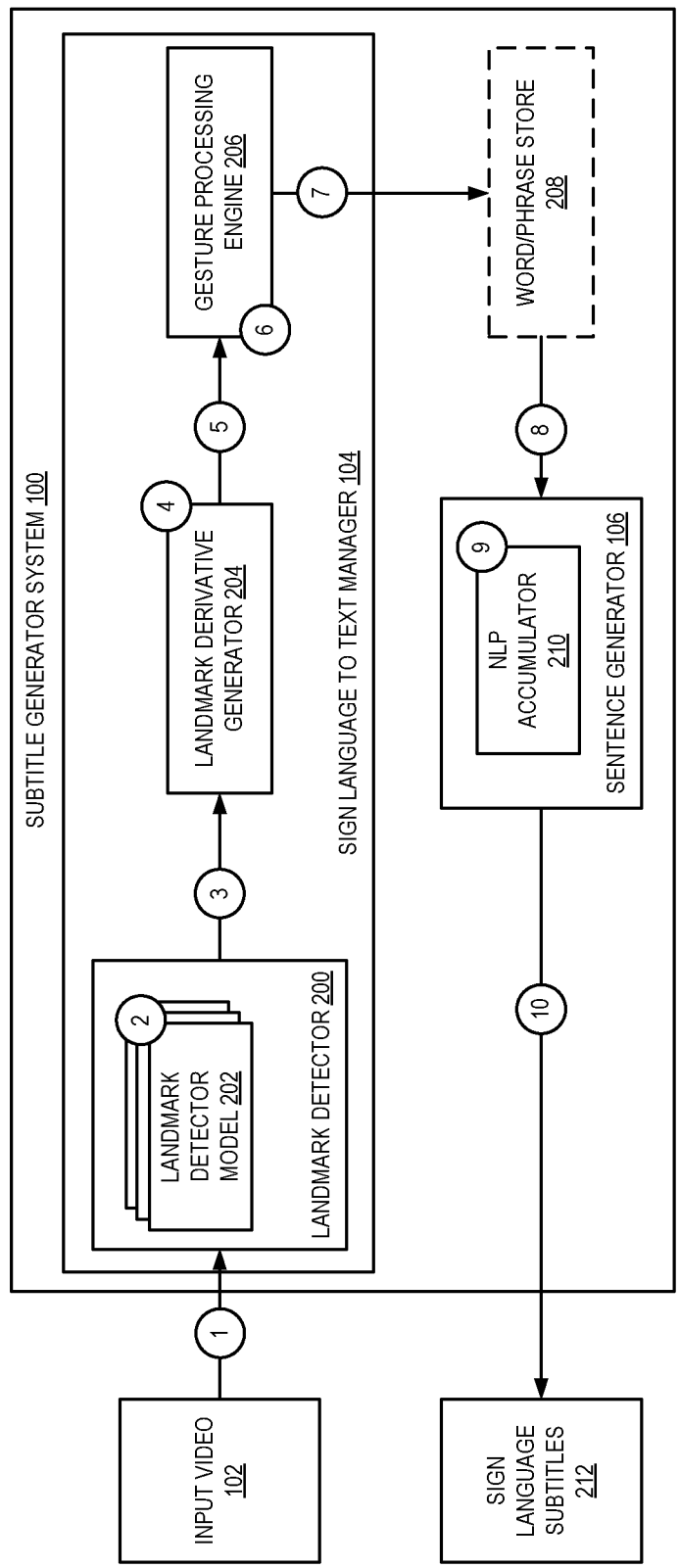
FIG. 2 illustrates a diagram of a process of sign language subtitle generation in accordance with one or more embodiments.

FIG. 2 illustrates a diagram of a process of sign language subtitle generation in accordance with one or more embodiments. As shown in FIG. 2, input video 102 is received by landmark detector 200 of sign language to text manager 104, at numeral 1. As discussed, the landmark detector 200 may include one or more landmark detector models 202, such as a hand landmark detection model, a face landmark detection model, a pose landmark detection model, etc. For example, any suitable model that performs 2D landmark detection for palms can be used, such as MediaPipe or other suitable palm detection and landmark identification model. In some embodiments, the hand landmarks may include a plurality of landmarks corresponding to points on the signer's hand (such as a set of 21 landmark points on a segmented palm—four for each finger joint and one for the middle of the wrist). Similarly, an appropriate facial landmark model which identifies landmarks associated with the signer's facial features (e.g., eyes, brows, nose, mouth, chine, etc.) may be used to identify facial landmarks. For frames where a large portion of the body is visible, the landmarks obtained from a pose estimation model become relevant. Any state-of-the-art model, such as OpenPose, may be used to obtain pose landmarks associated with the signer's body.

At numeral 2, coordinates for hand, face, and/or post landmarks are output by the corresponding landmark detector models 202. In some embodiments, the coordinates may be output for a single frame and/or for a plurality of sequential frames (e.g., the current frame and one or more previous frames). At numeral 3, the landmark coordinates are provided to landmark derivative generator 204. The landmark derivative generator 204 generates higher order derivatives of the landmarks (e.g., velocity, acceleration, etc.) at numeral 4. For example, having obtained coordinates for hand, face and body for the current frame, embodiments then generate at least two additional attributes for each landmark point:

$\{(x_0,y_0), (x_1,y_1), \ldots, (x_i,y_i)\}$

The velocity at a frame is calculated as the displacement from the previous frame divided by the time interval between the two frames.

$$v = v_x \hat{i} + v_y \hat{j}$$
$$v_x = \frac{x_i - x_{i-1}}{\Delta t}$$
$$v_y = \frac{y_i - y_{i-1}}{\Delta t}$$

Acceleration is computed in a manner similar to velocity but can be more difficult to compute accurately. For example, errors in the computed landmark positions affect the higher-order derivatives more, especially when things are moving fast. To handle this, embodiments take a weighted average using the data from multiple prior frames. For example, in some embodiments, the prior three frames are used. In such an example:

$$a_{frames=1} = \frac{v_i - v_{i-1}}{\Delta t_{i-1}}$$
$$a_{frames=2} = \frac{v_i - v_{i-2}}{\Delta t_{i-1} + \Delta t_{i-2}}$$
$$a_{frames=3} = \frac{v_i - v_{i-3}}{\Delta t_{i-1} + \Delta t_{i-2} + \Delta t_{i-3}}$$
$$a_i = w_1 * a_{frames=1} + w_2 * a_{frames=2} + w_3 * a_{frames=3}$$

In various embodiments, the weights used for each acceleration term may vary depending on empirical observation and/or known characteristics of the video. For example, when motion in the video is not that rapid, then $w_1$ may be weighted more highly than the others, but if the motion is rapid or the frame rate is too low then the weights may be more even or the $w_2$ and $w_3$ may be weighted more highly. In some embodiments, $w_1=0.45$, $w_2=0.35$, and $w_3=0.2$.

At numeral 5, gesture processing engine receives the landmark coordinates and the derivatives generated by landmark derivative generator 204. In some embodiments, this data is provided as a vector. For example, the hand landmarks and associated derivatives may form one vector, the face landmarks and associated derivatives may form a second vector, etc. These vectors may be concatenated to form the input to the gesture processing engine 206. The gesture processing engine 206 includes one or more gesture detection models (e.g., LSTM networks) that have been trained to identify gestures depicted in the input video 102. At numeral 6, the gesture processing engine uses the gesture detection models to identify gestures and corresponding words/phrases of the sign language depicted in the input video.

In some embodiments, as the words/phrases are identified they are optionally stored in word/phrase store 208. For example, the word/phrase store may be implemented as a cache which stores the words/phrases and their associated timestamp data for where they were detected in the input video. The word/phrase store 208 may store the identified words/phrases until the entire video has been processed. The sentence generator 106 can then read the words/phrases from the word/phrase store 208 at numeral 8 when the video has been fully processed. Alternatively, the sentence generator 106 can read from the word/phrase store 208 before the entire video has been processed. In some embodiments, the sentence generator 106 can receive words/phrases as they are identified directly from the gesture processing engine 206 and locally cache the words/phrases as needed.

Sentence generator 106 may include a natural language processing (NLP) accumulator 210. At numeral 9, the NLP accumulator 210 identifies sentences from the words/phrases. One coherent utterance/sentence may occur over multiple frames and include one or more words and phrases. In some embodiments, the NLP accumulator 210 is responsible for stitching words/phrases into a coherent sentence, delineating two adjacent sentences (e.g., detecting sentence boundaries), and determining start time and end timestamp of a subtitle sentence. In some embodiments, the sentence boundaries are detected based on pauses. For example, a pause threshold may be used to determine when a pause in the signing of the signer indicates the end of a sentence. Additionally, or alternatively, if the subject is lost (e.g., the signer's face, hand, etc. is no longer in frame) then this may be taken as a cue of the end of a sentence. Likewise, the end of a sentence may be inferred based on the syntax of the sentence/utterance. For example, in the absence of a pause or loss of subject, then a syntactic analysis may be performed on the translated words to detect sentence boundaries. However, because sign language translations might have incomplete syntactic structure within a sentence, a modified solution of the classical "sentence boundary disambiguation" problem is used. This may be solved in a number of ways, such as is known in the art. Once the sentences have been identified along with their timestamps, at numeral 10 the resulting sign language subtitles 212 are output. For example, the sentences and timestamps may be encoded into a subtitle track. During playback, the subtitle track is synced with its associated video such that the subtitles are displayed at the appropriate playback time.

Figure 3:
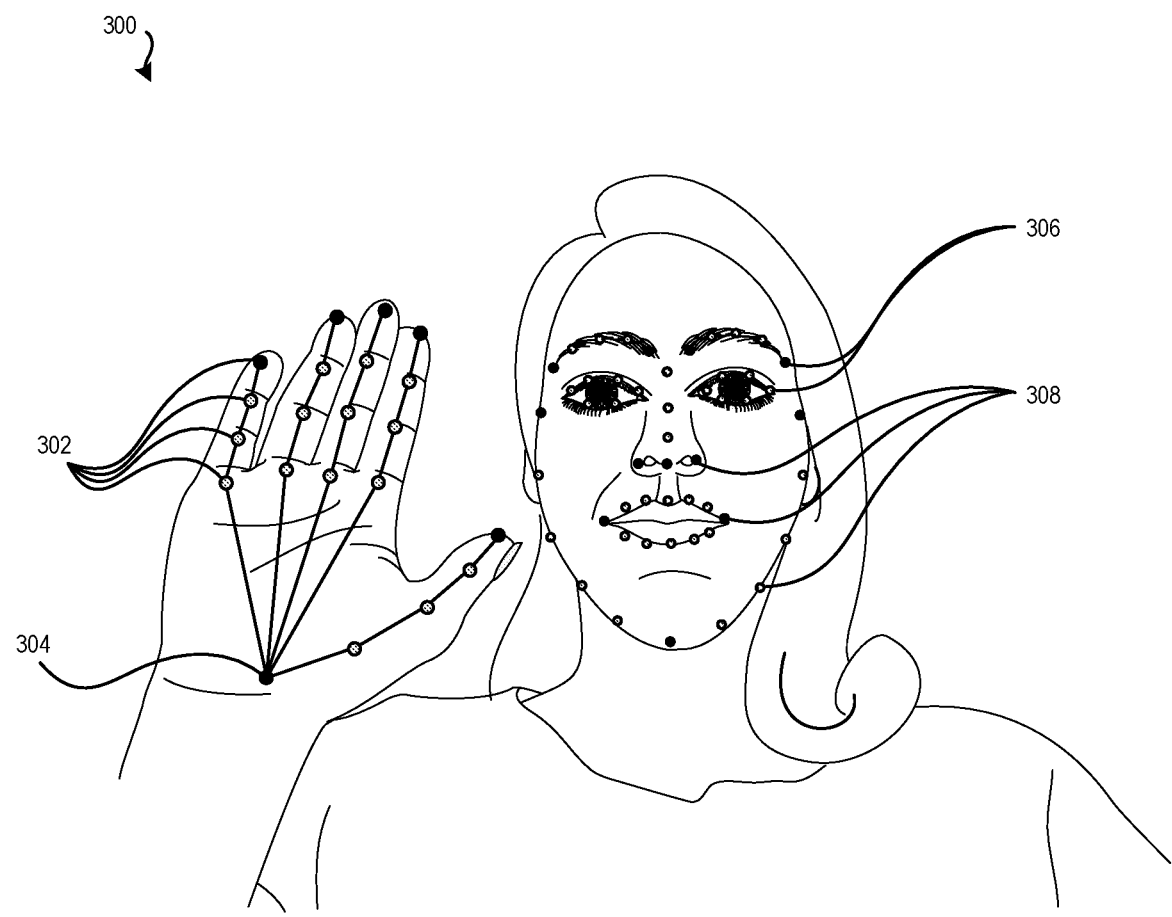
FIG. 3 illustrates an example of hand and face landmarks in accordance with one or more embodiments.

FIG. 3 illustrates an example of hand and face landmarks in accordance with one or more embodiments. As discussed, a landmark detection model may be used to identify landmarks associated with a signer depicted in an input video. In the example of FIG. 3, a frame 300 of an input video includes a depiction of both a signer's face and hand. As such, a hand detection model may be used to identify a plurality of landmarks associated with the signer's hand. For example, each finger and thumb may be associated with four landmarks, such as landmarks 302, where each landmark corresponds to a finger/thumb joint. Additionally, a landmark may be identified in the center of the wrist 304.

A face landmark detection model may be used to identify facial landmarks. For example, as shown in FIG. 3, numerous landmarks associated with the signer's eyes and brows 306, as well as nose, mouth, and chin, may be identified. Landmarks may also identify the general outline of the signer's face. As discussed, these landmarks enable the relative position of the parts of the signer's body to be determined. For instance, in the example of FIG. 3, the signer's hand can be determined to be located near the signer's face. By localizing the signer's hand, those gestures which require proximity to the face (or other part of the signer's body) are more accurately identified.

Figure 4:
FIG. 4 illustrates an example of pose landmarks in accordance with one or more embodiments.

FIG. 4 illustrates an example of pose landmarks in accordance with one or more embodiments. As shown in FIG. 4, when the signer's body is shown in frame, a pose landmark detection model can be used to obtain landmarks for all or part of the signer's body. For example, the pose landmarks can determine a center of the signer's torso 400 and a plurality of points describing the signer's arms 404 and legs 406, as well as their head and neck 408. These landmarks further aid in localizing the gestures based on the relative positions of the hands and more portions of the signer's body.

Figure 5:
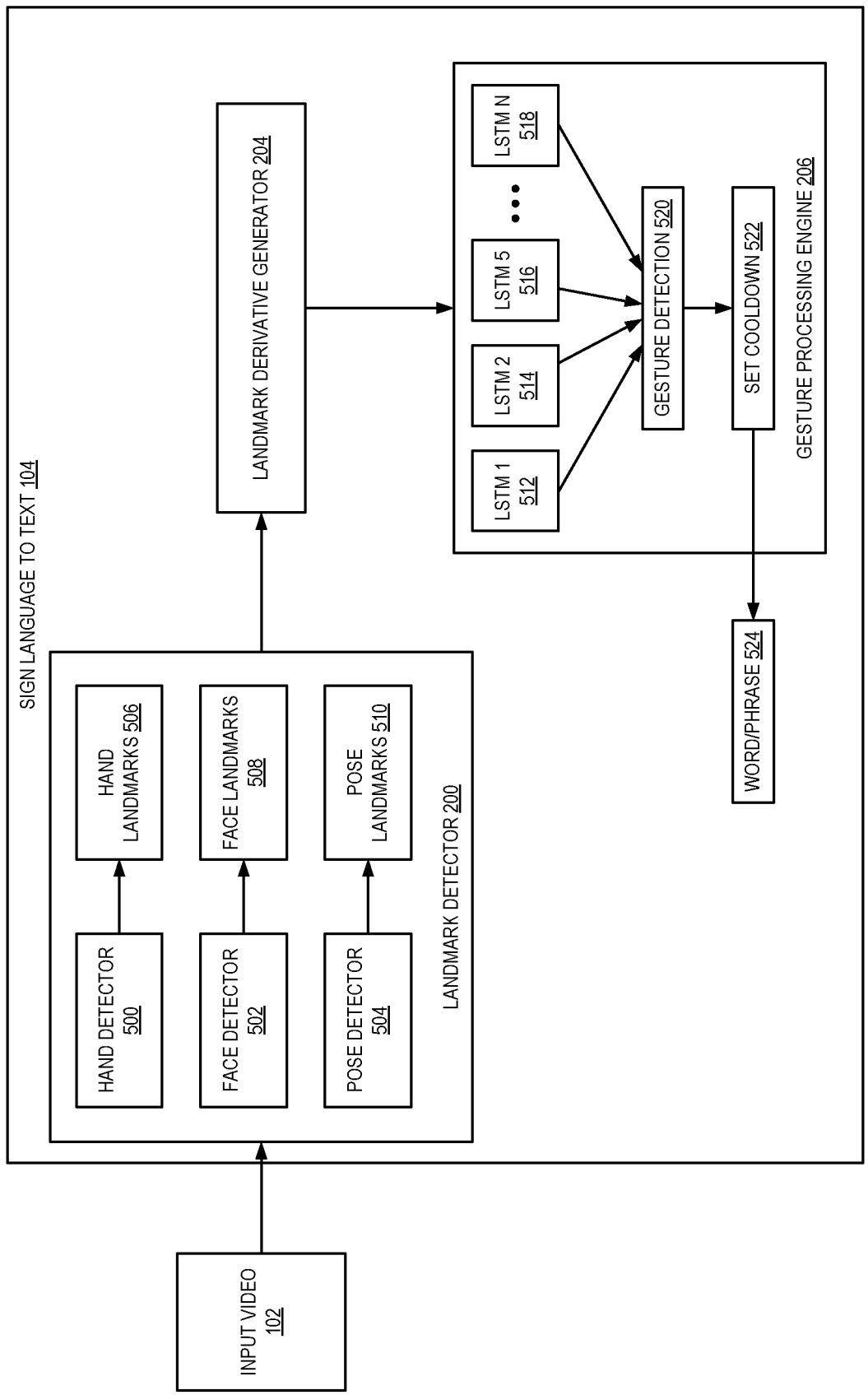
FIG. 5 illustrates a diagram of a sign language to text system in accordance with one or more embodiments.

FIG. 5 illustrates a diagram of a sign language to text system in accordance with one or more embodiments. As shown in FIG. 5, an input video is first received by sign language to text manager 104. Specifically, the frames of the input video are received by landmark detector 200. In the example of FIG. 5, landmark detector 200 includes three detector models: a hand (or palm) detector 500, a face detector 502, and a pose detector 504. As discussed, each detector model may be a pretrained machine learning model or algorithm configured to identify landmarks on a body or body part. As shown, the hand detector 500 outputs hand landmarks 506, face detector 502 outputs face landmarks 508, and pose detector 504 outputs pose landmarks 510. These include coordinates of the landmarks in the frame being processed.

The landmark data is provided to landmark derivative generator 204. As discussed, landmark derivative generator calculates higher order derivatives (e.g., velocity, acceleration, etc.) based on the landmark data across multiple frames. For example, the velocity data is calculated based on a pair of sequential frames and the acceleration data is calculated based on a plurality of sequential frames. The landmark coordinates and landmark derivatives are provided to gesture processing engine 206 to identify the gestures depicted in the input video. Each gesture detection model outputs a value indicating the probability of a match with a gesture. In some embodiments, the input landmark data may be provided serially to each gesture detection model until one successfully identifies a gesture. Alternatively, the gesture detection models may process the input landmark data in parallel.

As discussed, gesture processing engine 206 may include one or more gesture detection models (e.g., LSTM 1-LSTM N 512-314). Each gesture detection model may be trained to identify one or more gestures. For example, a gesture detection model may be trained on a single gesture in which case it acts like a binary classifier. Alternatively, a gesture detection model may be trained to identify multiple gestures in which case it acts as a multi-class classifier. In some embodiments, some gesture detection models may be trained to identify a single gesture, while others may be trained to identify multiple gestures. Because of the relatively large vocabulary of sign language words, in some embodiments, the vocabulary is split into groups of approximately ten gestures each. Each such group is trained using a separate LSTM. Problematic words/phrases (e.g., those that are frequently mispredicted in the confusion matrix) may assigned a separate LSTM.

Gesture detection 520 occurs when the output value of a gesture detection model exceeds a trigger threshold. Based on the results on the validation/test set, an appropriate value for the threshold has to be chosen. The threshold helps ignore noise in the predicted values. The threshold should be large enough to ward off unwanted false positives. Observation of sign language behavior reveals that gestures are often repeated for some time duration without meaning to repeat the words. For example, consider the gesture for ASL 'sorry', which includes moving fingers in a circular motion near the chest. The number of revolutions is not precise, and depending on the person doing the gesture, the duration/revolutions may vary slightly. This can cause the gesture detection network to fire consecutively, causing unwanted repetition of words. Accordingly, a cooldown period is chosen such that if the same gesture is continued beyond the cooldown period, it is likely that the signer wants to repeat the word. Setting the cooldown 522 disables gesture processing by that LSTM for a number of frames based on the cooldown threshold. This prevents the LSTM retriggering the same gesture in immediately adjacent frames. Once the cooldown has been set, then the word/phrase 524 associated with the triggered gesture is output. As discussed, once the words/phrases from the input video are identified, they are provided to the sentence generator to generate the subtitles for the sign language content.

Figure 6:
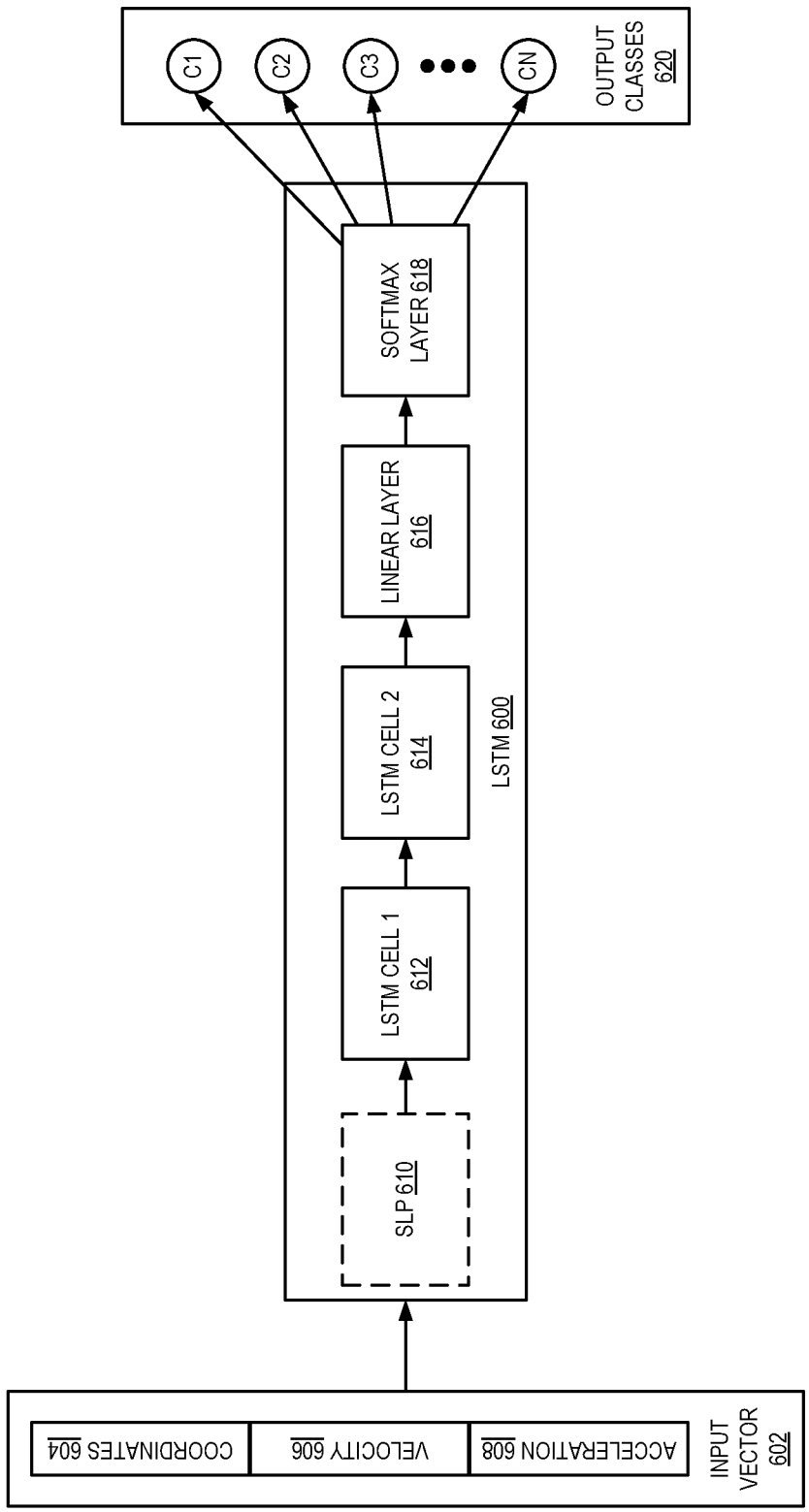
FIG. 6 illustrates an architecture diagram of a gesture detection model in accordance with one or more embodiments.

FIG. 6 illustrates an architecture diagram of a gesture detection model in accordance with one or more embodiments. LSTMs are notoriously time consuming to train, deep LSTMs more so. But the major problem with a deep LSTM is increased inference time. Hence, it is preferable from a performance and resource usage perspective to keep the LSTM as shallow as possible. However, a shallow LSTM results in poor accuracy. To address these performance and accuracy issues, a moderately deep LSTM 600 architecture that includes two stacked LSTM cells is used. Additionally, the input vector 602 includes landmark coordinates 604 and precomputed velocity landmark data 606 and acceleration landmark data 608. Pre-computing the higher derivatives of landmark coordinates (velocity, acceleration, etc.) allows for a moderately deep LSTM architecture to be used, reducing training and inference time of the model without compromising accuracy.

In some embodiments, landmark coordinates 604, velocity data 606, and acceleration data 608 correspond to the landmarks of a single landmark detector (e.g., the hand, face, or pose detector). When landmark data is available from multiple detectors, the landmark/velocity/acceleration vector from each landmark detector may be concatenated together. Optionally, in some embodiments, the input vector 602 is received by a single layer perceptron (SLP) 610 which determines which portions of the input vector are important. This also allows for the input vector 602 to be organized arbitrarily, as the SLP 610 can rearrange and reweight the data as needed. LSTM 600 includes two LSTM cells, cell 1 612 and cell 2 614. the output of LSTM cell 2 614 is provided to linear layer 616. The output of linear layer 616 is provided to SoftMax layer 618 which normalizes the output to a probability distribution for the classes 620 (e.g., gestures) that this particular LSTM 600 has been trained to identify. In some embodiments, the SoftMax layer is a LogSoftMax layer.

Figure 7:
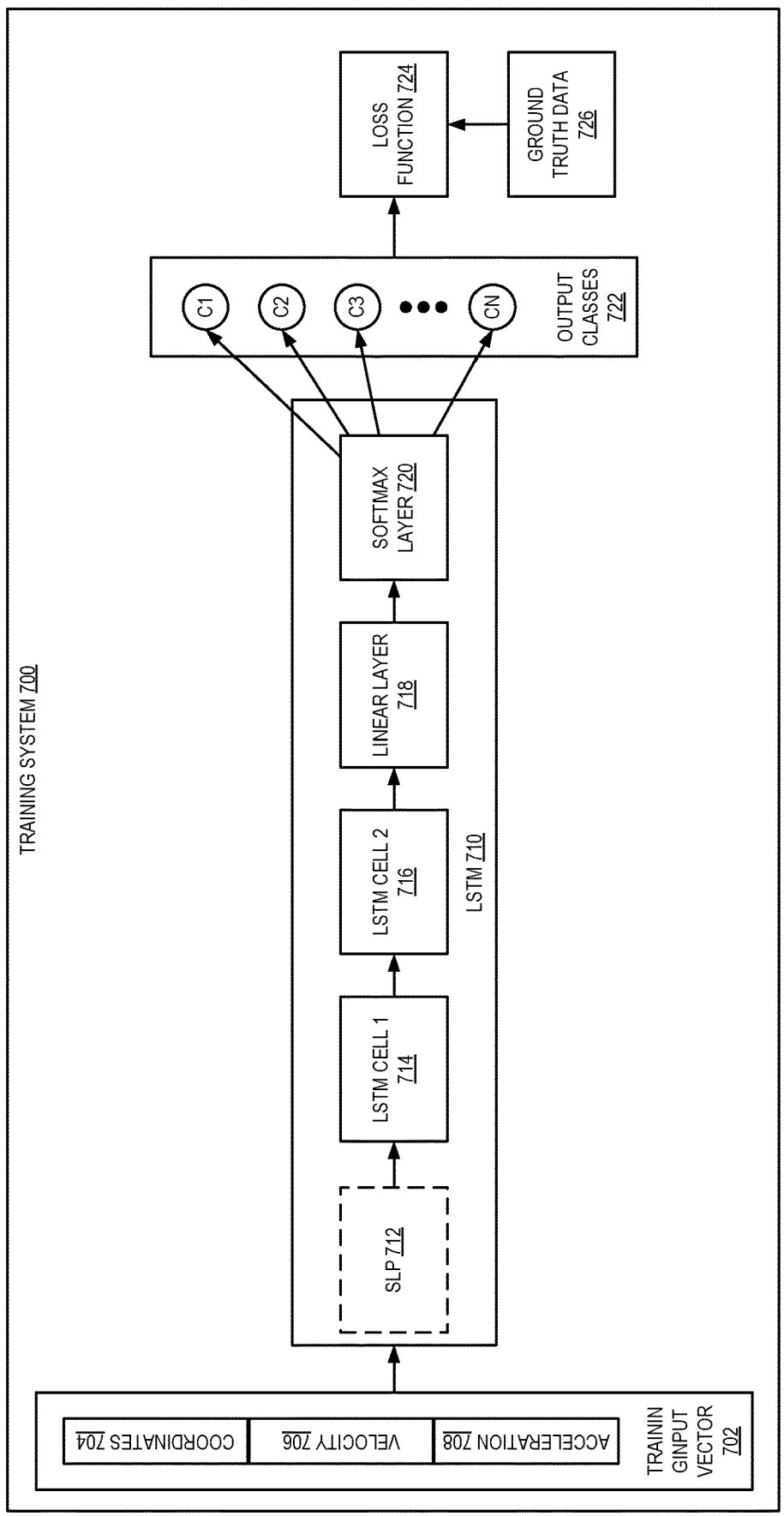
FIG. 7 illustrates a diagram of a training system in accordance with one or more embodiments.

FIG. 7 illustrates a diagram of a training system in accordance with one or more embodiments. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In the example of FIG. 7, training system 700 can be used to train a plurality of LSTM networks to identify one or more gestures. Training input vector 702 can include landmark coordinates 704 and corresponding velocity data 706 and acceleration data 708. The input vector may be obtained from training videos in the same manner as discussed above for input videos (e.g., using landmark detector 200 and landmark derivative generator 204). The training input vector is provided to the LSTM 710 being trained which, as discussed above, may optionally include SLP 712, two LSTM cells 714, 716, a linear layer 718, and a SoftMax layer 720.

The output of LSTM 710 includes a probabilistic distribution across N classes that LSTM 710 is being trained to identify. For example, if the LSTM is being trained to identify ten gestures, then N=10. This output is then compared, using loss function 724, to ground truth data 726. In some embodiments, the ground truth data is obtained by manually tagging the gesture actions with a keystroke while recording the landmarks data per frame. Higher-order features may be computed deterministically from the landmark coordinate data. In some embodiments, the loss function 724 is a negative log likelihood loss. High loss penalizes the network and low loss rewards the network. Observationally, the NLLLoss was found to saturate after approximately 900 epochs.

Figure 8:
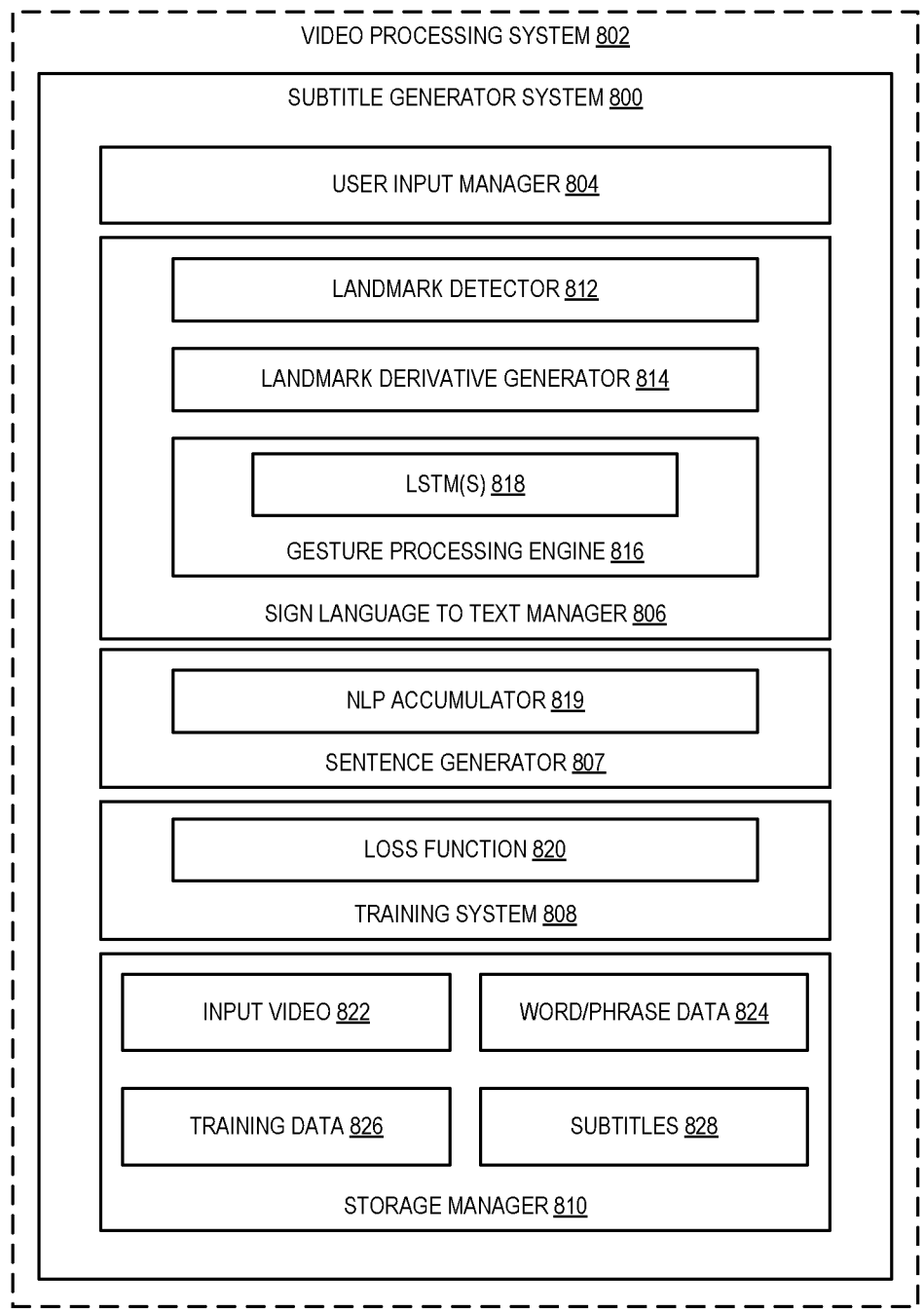
FIG. 8 illustrates a schematic diagram of a subtitle generation system in accordance with one or more embodiments.

FIG. 8 illustrates a schematic diagram of subtitle generator system (e.g., "subtitle generator system" described above) in accordance with one or more embodiments. As shown, the subtitle generator system 800 may optionally be implemented as part of a video processing system 802 or as a standalone system. The subtitle generator system 800 may include, but is not limited to, user input manager 804, sign language to text manager 806, sentence generator 807, training system 808, and storage manager 810. The sign language to text manager 806 includes a landmark detector 812, a landmark derivative generator 814, and a gesture processing engine 816. The gesture processing engine includes one or more LSTM networks 818. The sentence generator 807 includes NLP accumulator 819. The training system 808 includes loss function 820. The storage manager 810 includes input video 822, word/phrase data 824, training data 826, and subtitles 828.

The subtitle generator system 800 includes a user input manager 804 that allows users to provide input to the subtitle generator system and/or video processing system. For example, the user input manager 804 allows users to select videos for which to have sign language subtitles automatically generated. In some embodiments, the user input manager 804 enables a user to select a video file stored or accessible by storage manager 810, such as input video 822. In some embodiments, the user input manager 804 allows users to select specific portions of a video to be subtitled. For example, once a video has been selected, the user may select one or more portions of the video (e.g., one or more contiguous frames of the input video) that include sign language content. The frames corresponding to those selected portions may be extracted and provided to the subtitle generator system 800 to be subtitled.

As further illustrated in FIG. 8, the subtitle generator system 800 further includes the sign language to text manager 806. The frames of the input video are provided to landmark detector 812. As discussed, the landmark detector 812 may include a plurality of detector models, such as a hand detector, a face detector, and a pose detector. These detectors may include pretrained models that identify one or more landmarks on the representation of a signer in the frames of the input video. These landmark coordinates are then provided to landmark derivative generator 814 to calculate higher order derivatives (e.g., velocity, acceleration, etc.) of the landmarks as they move across frames. The landmark coordinates and the higher order derivative data is then combined and provided to gesture processing engine 816.

As discussed, an input vector may be generated that includes the landmark data and higher order derivative data from a given detector. When this data is available from multiple detectors, the resulting vectors can be concatenated prior to being provided to gesture processing engine 816. The gesture processing engine 816 may include a plurality of LSTMs 818 (e.g., gesture detection models) which have each been trained to identify one or more sign language gestures. As discussed, the LSTMs 818 can process the input vector serially or in parallel. Once an LSTM detects a gesture (e.g., the probability output by an LSTM exceeds a trigger threshold), then a cooldown is set and the word/phrase corresponding to the detected gesture is output. The cooldown prevents the same LSTM from triggering on a number of subsequent frames set by the cooldown threshold. For example, some words may be repeatedly signed without intending the word to be repeated, this cooldown increases the likelihood that a repeated word is intended to be repeated.

As further illustrated in FIG. 8, the subtitle generator system 800 further includes sentence generator 807. The sentence generator 807 includes NLP accumulator 819 which is responsible for generating coherent sentences from the words/phrases output by the sign language to text manager 806. In some embodiments, the sentence generator 807 receives the words/phrases directly from the sign language to text manager. Alternatively, the sentence generator 807 reads the words/phrases from a local data store or cache via storage manager 810 (e.g., word/phrase data 824). NLP accumulator 819 employs a heuristic-based approach for detecting sentence/utterance boundaries. Sentence/utterance boundaries can be detected using long pauses (e.g., exceeding a pause threshold), when the face and/or hands go out of sight for multiple frames, or the scene shifts to a new user. If long sentences are obtained even after above heuristics, embodiments can use a syntactical analysis as is known in the art to identify sentence boundaries.

As further illustrated in FIG. 8, the subtitle generator system 800 includes training system 808 which is configured to teach, guide, tune, and/or train one or more neural networks. In particular, the training system 808 trains a neural network, such as LSTMs 818, based on a plurality of training data (e.g., training data 826). In some embodiments, the training data include digital videos that have been manually labeled with a gesture identifier when the gesture is performed in the video. A representation of the signer (e.g., a vector including the landmark coordinates and corresponding higher order derivative data) is provided to the LSTM being trained. The LSTM then learns to classify the representation as a specific gesture. More specifically, the training system 808 is configured to access, identify, generate, create, and/or determine training input and utilize the training input to train and fine-tune a neural network. For instance, the training system 808 trains the kernel prediction network to learn to classify gestures using loss function 820. Loss function 820, as discussed above, may be a negative log likelihood loss. Training system 808 trains the LSTM to minimize the loss. Because each LSTM is trained on specific gestures, the gesture processing engine is not limited to any specific sign language. Instead, it can be extended to support as many sign languages are needed by training additional LSTMs on the specific gestures of that language.

As illustrated in FIG. 8, the subtitle generator system 800 also includes the storage manager 810. The storage manager 810 maintains data for the subtitle generator system 800. The storage manager 810 can maintain data of any type, size, or kind as necessary to perform the functions of the subtitle generator system 800. The storage manager 810 includes input video 822. Input video 822 can include information for any digital video that includes sign language content to be subtitled by subtitle generator system 800. For example, input video 822 includes a digital video provided by a user, where the user seeks to add subtitles to at least a portion of the video that includes sign language content. The storage manager 810 also includes word/phrase data 824. As discussed, this may include words/phrases corresponding to gestures that have been identified by the gesture processing engine 816.

As further illustrated in FIG. 8, the storage manager 810, as shown in FIG. 8, also includes the training data 826. The training data 826 can include a plurality of digital training videos that have been manually labeled with the gestures that are depicted therein, as discussed in additional detail above. In particular, in one or more embodiments, the training data 826 include digital training videos utilized by the training system 808 to train one or more neural networks to classify sign language gestures. The storage manager 810 also includes subtitles 828. As discussed, the subtitles 828 include sentences that are timestamped based on when the gestures were detected, as output by sentence generator 807.

Each of the components 804-810 of the subtitle generator system 800 and their corresponding elements (as shown in FIG. 8) may be in communication with one another using any suitable communication technologies. It will be recognized that although components 804-810 and their corresponding elements are shown to be separate in FIG. 8, any of components 804-810 and their corresponding elements may be combined into fewer components, such as into a single facility or module, divided into more components, or configured into different components as may serve a particular embodiment.

The components 804-810 and their corresponding elements can comprise software, hardware, or both. For example, the components 804-810 and their corresponding elements can comprise one or more instructions stored on a computer-readable storage medium and executable by processors of one or more computing devices. When executed by the one or more processors, the computer-executable instructions of the subtitle generator system 800 can cause a client device and/or a server device to perform the methods described herein. Alternatively, the components 804-810 and their corresponding elements can comprise hardware, such as a special purpose processing device to perform a certain function or group of functions. Additionally, the components 804-810 and their corresponding elements can comprise a combination of computer-executable instructions and hardware.

Furthermore, the components 804-810 of the subtitle generator system 800 may, for example, be implemented as one or more stand-alone applications, as one or more modules of an application, as one or more plug-ins, as one or more library functions or functions that may be called by other applications, and/or as a cloud-computing model. Thus, the components 804-810 of the subtitle generator system 800 may be implemented as a stand-alone application, such as a desktop or mobile application. Furthermore, the components 804-810 of the subtitle generator system 800 may be implemented as one or more web-based applications hosted on a remote server. Alternatively, or additionally, the components of the subtitle generator system 800 may be implemented in a suit of mobile device applications or "apps." To illustrate, the components of the subtitle generator system 800 may be implemented in a video processing application, including but not limited to ADOBE® PREMIERE® PRO. "ADOBE®" and "ADOBE® PREMIERE®" are either registered trademarks or trademarks of Adobe Inc. in the United States and/or other countries.

Figure 9:
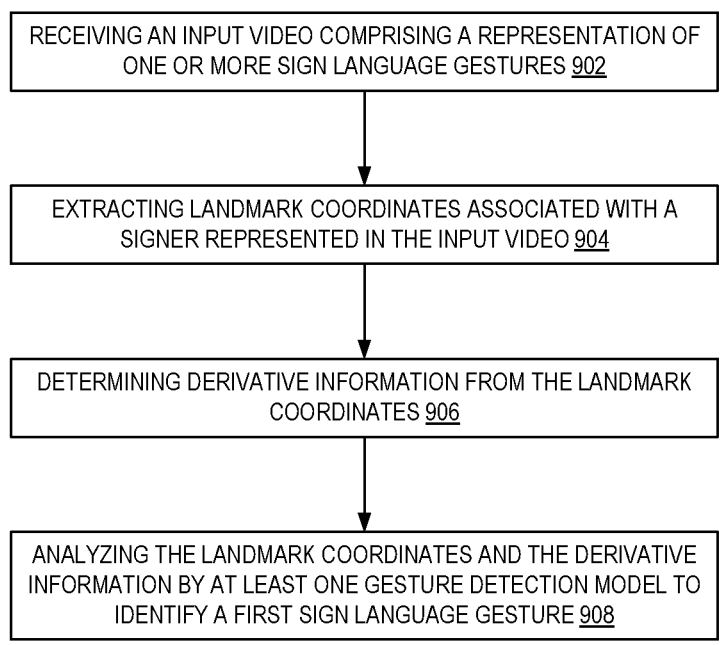
FIG. 9 illustrates a flowchart of a series of acts in a method of sign language subtitle generation in accordance with one or more embodiments.
Figure 10:
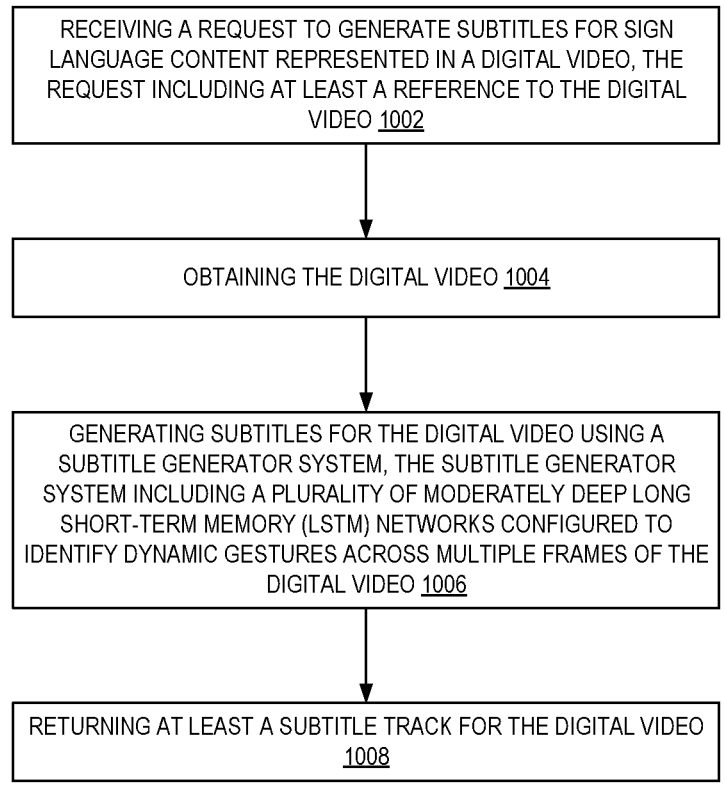
FIG. 10 illustrates a flowchart of a series of acts in a method of sign language subtitle generation in accordance with one or more embodiments.

FIGS. 1-8, the corresponding text, and the examples, provide a number of different systems and devices that allows for automatic generation of subtitles for sign language content within digital visual media. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of sign language subtitle generation in accordance with one or more embodiments. In one or more embodiments, the method 900 is performed in a digital medium environment that includes the subtitle generator system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving an input video comprising a representation of one or more sign language gestures. For example, the user can select a video stored locally or remotely that is accessible to the subtitle generator system. This may include navigating a file system, a storage service, or other storage location/system for the target video file.

As illustrated in FIG. 9, the method 900 further includes an act 904 of extracting landmark coordinates associated with a signer represented in the input video. As discussed, a landmark detector may include multiple detection models configured to identify landmarks associated with different parts of a signer's body. For example, in some embodiments, extracting landmark coordinates includes extracting hand landmark coordinates using a hand landmark detector, extracting face landmark coordinates using a face landmark detector, and extracting pose landmark coordinates using a pose landmark detector. In some embodiments, extracting landmark coordinates includes extracting landmark coordinates from a plurality of consecutive frames of the input video.

As illustrated in FIG. 9, the method 900 further includes an act 906 of determining derivative information from the landmark coordinates. As discussed, higher order derivatives of the landmark coordinates can be precomputed to be provided to the gesture detection models to improve model accuracy and performance. The higher order derivatives (e.g., velocity, acceleration, etc.) can be computed based on the change in position of the landmarks across multiple frames, as discussed above. In some embodiments, determining the derivative information further includes computing velocity data for the landmark coordinates based on the landmark coordinates from two of the plurality of consecutive frames of the input video, and computing acceleration data for the landmark coordinates based on the landmark coordinates from the plurality of consecutive frames of the input video.

As illustrated in FIG. 9, the method 900 further includes an act 908 of analyzing the landmark coordinates and the derivative information by at least one gesture detection model to identify a first sign language gesture. In some embodiments, the method further includes iteratively processing frames of the input video to identify a plurality of sign language gestures. In some embodiments, analyzing the landmark coordinates further includes setting a cooldown period associated with a gesture detection model that identified the first sign language gesture, wherein the cooldown period disables the gesture detection model until the cooldown period expires. Using the cooldown period, if a gesture is quickly repeated by the signer, the corresponding LSTM will not trigger multiple times. In some embodiments, each gesture detection model is a LSTM model trained to identify one or more gestures.

In some embodiments, the method further includes receiving, by a natural language processing (NLP) accumulator, a plurality of words or phrases corresponding to the plurality of sign language gestures, identifying a timestamp associated with each of the plurality of words or phrases, and generating subtitles based on the plurality of words or phrases and associated timestamps. For example, a subtitle track may be encoded using the timestamps and sentences that have been identified from the words/phrases. In some embodiments, generating subtitles further includes detecting a pause between identified gestures from the plurality of sign language gestures greater than a pause threshold, and identifying a sentence boundary based on the pause.

FIG. 10 illustrates a flowchart 1000 of a series of acts in a method of sign language subtitle generation in accordance with one or more embodiments. In one or more embodiments, the method 1000 is performed in a digital medium environment that includes the subtitle generator system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a request to generate subtitles for sign language content represented in a digital video, the request including at least a reference to the digital video. For example, a user may access a cloud-based video processing service via a client device. The client device may include a standalone client application associated with the video processing service or the video processing service may be accessed via a browser or other interface. The user can request subtitles be added to a digital video by selecting a user interface element corresponding to the subtitle generator system.

As illustrated in FIG. 10, the method 1000 further includes an act 1004 of obtaining the digital video. For example, the user may upload the video to the video processing service. Alternatively, the video may be stored in a storage service accessible to the video processing service. The video processing service may obtain the digital video using the reference to the digital video provided with the request (e.g., a URI, URL, or other endpoint associated with a storage location of the storage service where the digital video is stored).

As illustrated in FIG. 10, the method 1000 further includes an act 1006 of generating subtitles for the digital video using a subtitle generator system, the subtitle generator system including a plurality of moderately deep long short-term memory (LSTM) networks configured to identify dynamic gestures across multiple frames of the digital video. For example, generating the subtitles may include extracting landmark coordinates associated with a signer represented in the digital video, determining derivative information from the landmark coordinates, analyzing the landmark coordinates and the derivative information by at least one gesture detection model to identify the first sign language gesture, iteratively processing frames of the digital video to identify a plurality of sign language gestures, receiving, by a natural language processing (NLP) accumulator, a plurality of words or phrases corresponding to the plurality of sign language gestures, identifying a timestamp associated with each of the plurality of words or phrases, and generating subtitles based on the plurality of words or phrases and associated timestamps.

As illustrated in FIG. 10, the method 1000 further includes an act 1008 of returning at least a subtitle track for the digital video. The subtitle track may include the plain text of the subtitle sentences generated by the subtitle generator system and the timestamps associated with the sentences. When played, the subtitle track is synced to the digital video such that the subtitles are displayed at the appropriate time during playback of the digital video.

Figure 11:
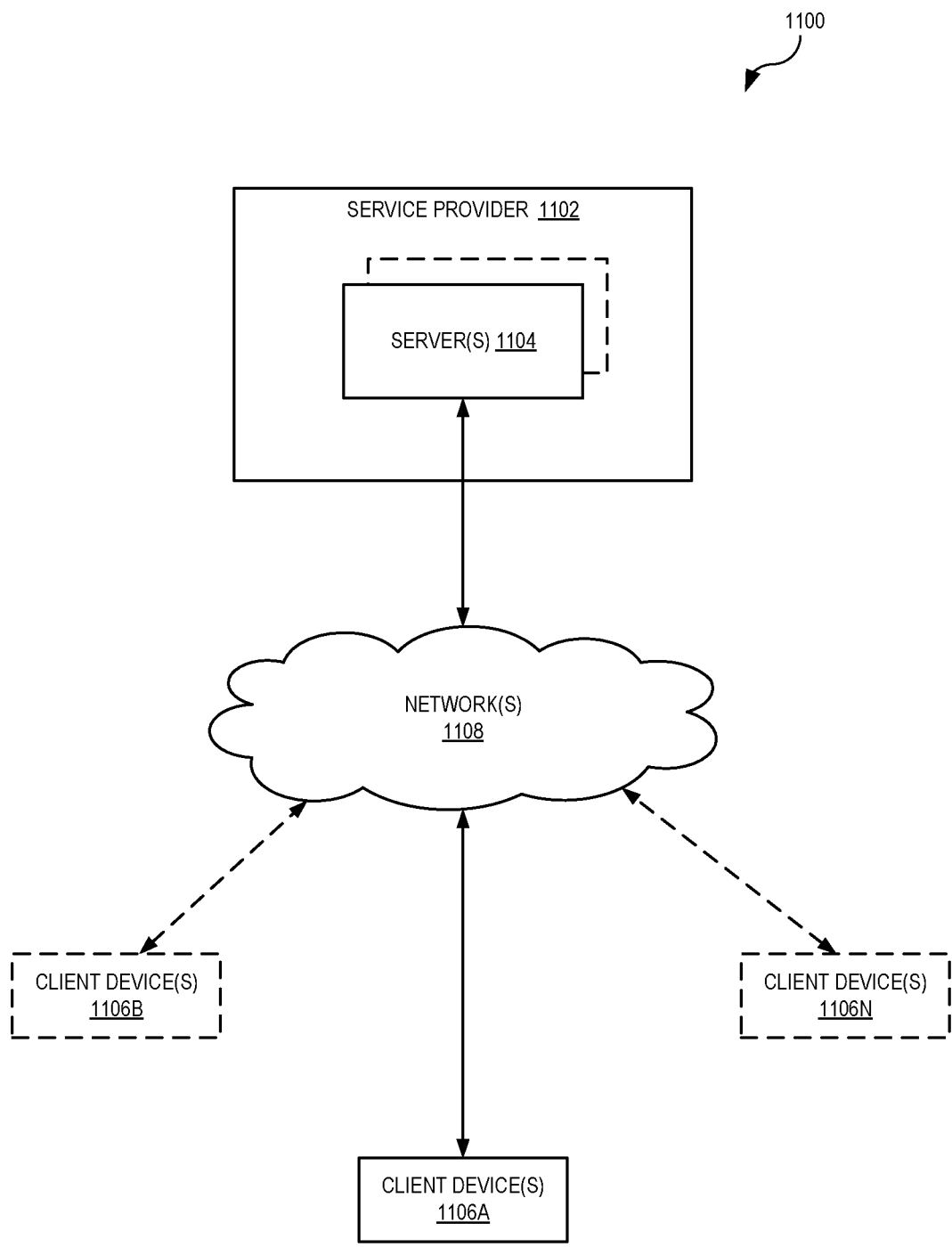
FIG. 11 illustrates a schematic diagram of an exemplary environment in which the image processing system can operate in accordance with one or more embodiments.

FIG. 11 illustrates a schematic diagram of an exemplary environment 1100 in which the subtitle generator system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the subtitle generator system 800. In particular, the subtitle generator system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input video 822, word/phrase data 824, training data 826, subtitles 828, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the subtitle generator system 800. In particular, the subtitle generator system 800 can comprise an application running on the one or more servers 1104 or a portion of the subtitle generator system 800 can be downloaded from the one or more servers 1104. For example, the subtitle generator system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital videos (e.g., the input video 822, such as via a video archive or an individual's personal videos) stored at the one or more servers 1104. Moreover, the client device 1106A can receive a request (i.e., via user input) to add subtitles to an input video and provide the request to the one or more servers 1104. Upon receiving the request, the one or more servers 1104 can automatically perform the methods and processes described above to automatically generate subtitles for sign language in video content. The one or more servers 1104 can provide the subtitles for all or portions of the input video that includes sign language content to the client device 1106A for display to the user.

As just described, the subtitle generator system 800 may be implemented in whole, or in part, by the individual elements 1102-1108 of the environment 1100. It will be appreciated that although certain components of the subtitle generator system 800 are described in the previous examples with regard to particular elements of the environment 1100, various alternative implementations are possible. For instance, in one or more embodiments, the subtitle generator system 800 is implemented on any of the client devices 1106A-N. Similarly, in one or more embodiments, the subtitle generator system 800 may be implemented on the one or more servers 1104. Moreover, different components and functions of the subtitle generator system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
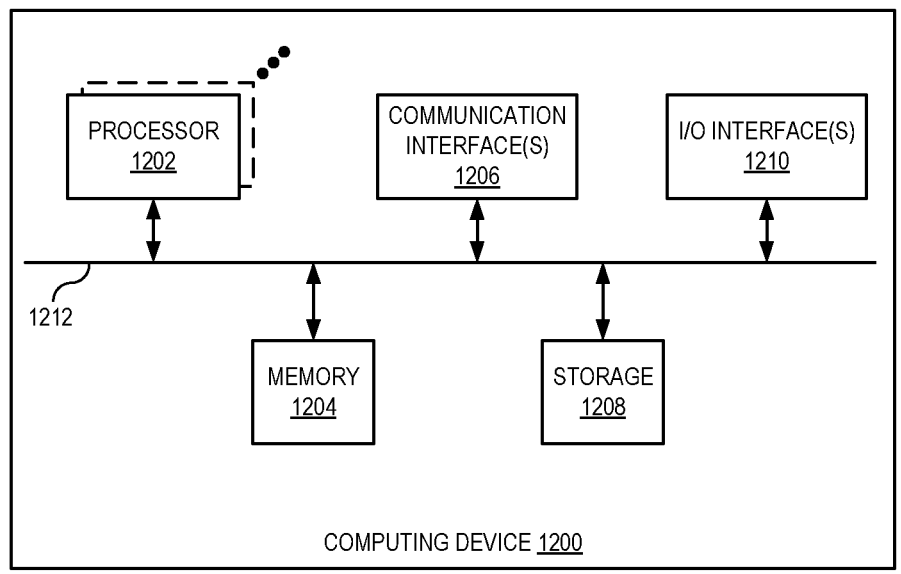
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving an input video comprising a representation of one or more sign language gestures;
   extracting landmark coordinates associated with a signer represented in the input video;
   determining derivative information from the landmark coordinates;
   generating a vector representation of the signer based on the landmark coordinates and the derivative information;
   processing, by a gesture detection model, the generated vector representation of the signer to identify sign language gestures;
   generating sentences based on the identified sign language gestures; and
   encoding the generated sentences and timestamps associated with the identified sign language gestures into a subtitle track, wherein the subtitle track is synced to the input video for display of the generated sentences at appropriate times during playback based on the timestamps.

2. The computer-implemented method of claim 1, wherein processing the generated vector representation of the signer to identify the sign language gestures further comprises:
   iteratively processing frames of the input video to identify the sign language gestures.

3. The computer-implemented method of claim 2, wherein generating the sentences based on the identified sign language gestures further comprises:
   receiving, by a natural language processing (NLP) accumulator, a plurality of words or phrases corresponding to the sign language gestures;
   identifying a timestamp associated with each of the plurality of words or phrases; and
   generating the sentences based on the plurality of words or phrases and associated timestamps.

4. The computer-implemented method of claim 3, wherein generating the sentences based on the plurality of words or phrases and associated timestamps, further comprises:
   detecting a pause between identified gestures from the sign language gestures greater than a pause threshold; and
   identifying a sentence boundary based on the pause.

5. The computer-implemented method of claim 1, wherein extracting landmark coordinates associated with a signer represented in the input video, further comprises:
- extracting hand landmark coordinates using a hand landmark detector;
- extracting face landmark coordinates using a face landmark detector; and
- extracting pose landmark coordinates using a pose landmark detector.

6. The computer-implemented method of claim 1, wherein processing the generated vector representation of the signer to identify the sign language gestures, further comprises:
- setting a cooldown period associated with the gesture detection model that identified the sign language gestures, wherein the cooldown period disables the gesture detection model until the cooldown period expires.

7. The computer-implemented method of claim 1, wherein each gesture detection model is a LSTM model trained to identify one or more gestures.

8. The computer-implemented method of claim 1, wherein extracting landmark coordinates associated with a signer represented in the input video, further comprises:
- extracting landmark coordinates from a plurality of consecutive frames of the input video.

9. The computer-implemented method of claim 8, wherein determining derivative information from the landmark coordinates, further comprises:
- computing velocity data for the landmark coordinates based on the landmark coordinates from two of the plurality of consecutive frames of the input video; and
- computing acceleration data for the landmark coordinates based on the landmark coordinates from the plurality of consecutive frames of the input video.

10. A non-transitory computer-readable storage medium including instructions stored thereon which, when executed by at least one processor, cause the at least one processor to:
- receive an input video comprising a representation of one or more sign language gestures;
- extract landmark coordinates associated with a signer represented in the input video;
- determine derivative information from the landmark coordinates;
- generate a vector representation of the signer based on the landmark coordinates and the derivative information;
- process, by a gesture detection model, the generated vector representation of the signer to identify sign language gestures;
- generate sentences based on the identified sign language gestures; and
- encode the generated sentences and timestamps associated with the identified sign language gestures into a subtitle track, wherein the subtitle track is synced to the input video for display of the generated sentences at appropriate times during playback based on the timestamps.

11. The non-transitory computer-readable storage medium of claim 10, wherein to process the generated vector representation of the signer to identify the sign language gestures, the instructions, when executed, further cause the at least one processor to:
- iteratively process frames of the input video to identify the sign language gestures.

12. The non-transitory computer-readable storage medium of claim 11, wherein to generate the sentences based on the identified sign language gestures, the instructions, when executed, further cause the at least one processor to:
- receive, by a natural language processing (NLP) accumulator, a plurality of words or phrases corresponding to the sign language gestures;
- identify a timestamp associated with each of the plurality of words or phrases; and
- generate the sentences based on the plurality of words or phrases and associated timestamps.

13. The non-transitory computer-readable storage medium of claim 12, wherein to generate the sentences based on the plurality of words or phrases and associated timestamps, the instructions, when executed, further cause the at least one processor to:
- detect a pause between identified gestures from the sign language gestures greater than a pause threshold; and
- identify a sentence boundary based on the pause.

14. The non-transitory computer-readable storage medium of claim 10, wherein to extract landmark coordinates associated with a signer represented in the input video, the instructions, when executed, further cause the at least one processor to:
- extract hand landmark coordinates using a hand landmark detector;
- extract face landmark coordinates using a face landmark detector; and
- extract pose landmark coordinates using a pose landmark detector.

15. The non-transitory computer-readable storage medium of claim 10, wherein to process the generated vector representation of the signer to identify the sign language gestures, the instructions, when executed, further cause the at least one processor to:
- set a cooldown period associated with the gesture detection model that identified the sign language gestures, wherein the cooldown period disables the gesture detection model until the cooldown period expires.

16. The non-transitory computer-readable storage medium of claim 10, wherein each gesture detection model is a LSTM model trained to identify one or more gestures.

17. The non-transitory computer-readable storage medium of claim 10, wherein to extract landmark coordinates associated with a signer represented in the input video, the instructions, when executed, further cause the at least one processor to:
- extracting landmark coordinates from a plurality of consecutive frames of the input video.

18. The non-transitory computer-readable storage medium of claim 17, wherein to determine derivative information from the landmark coordinates, the instructions, when executed, further cause the at least one processor to:
- computing velocity data for the landmark coordinates based on the landmark coordinates from two of the plurality of consecutive frames of the input video; and
- computing acceleration data for the landmark coordinates based on the landmark coordinates from the plurality of consecutive frames of the input video.

19. A computer-implemented method comprising:
- receiving a request to generate subtitles for sign language content represented in a digital video, the request including at least a reference to the digital video;
- obtaining the digital video;
- generating a vector representation of a signer of the sign language content based on landmark coordinates of the signer and derivative information determined from the landmark coordinates;

generating subtitles for the digital video using a subtitle generator system, the subtitle generator system including a plurality of moderately deep long short-term memory (LSTM) networks configured to identify dynamic gestures across multiple frames of the digital video using the generated vector representation of the signer, wherein the subtitle generator system generates the subtitles based on a plurality of words or phrases identified from the identified dynamic gestures and associated timestamps of the digital video; and syncing a subtitle track including the generated subtitles to the digital video for display of the generated subtitles at appropriate times during playback based on the associated timestamps of the digital video.

20. The computer-implemented method of claim 19, wherein generating subtitles for the digital video using a subtitle generator system, the subtitle generator system including a plurality of moderately deep long short-term memory (LSTM) networks configured to identify dynamic gestures across multiple frames of the digital video, further comprises:

analyzing the landmark coordinates and the derivative information by at least one gesture detection model to identify a first sign language gesture;

iteratively processing frames of the digital video to identify a plurality of sign language gestures;

receiving, by a natural language processing (NLP) accumulator, a plurality of words or phrases corresponding to the plurality of sign language gestures;

identifying a timestamp associated with each of the plurality of words or phrases; and generating the subtitles for the digital video based on the plurality of words or phrases and associated timestamps.

* * * * *